(12) United States Patent
Harada et al.

(10) Patent No.: US 8,133,563 B2
(45) Date of Patent: Mar. 13, 2012

(54) DOUBLE-SIDED PRESSURE-SENSITIVE ADHESIVE TAPE OR SHEET

(75) Inventors: Masatomi Harada, Ibaraki (JP); Shigeki Muta, Ibaraki (JP); Naoyuki Nishiyama, Ibaraki (JP); Kazumasa Tanaka, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 241 days.

(21) Appl. No.: 11/707,121

(22) Filed: Feb. 16, 2007

(65) Prior Publication Data

US 2007/0190280 A1 Aug. 16, 2007

(30) Foreign Application Priority Data

Feb. 16, 2006 (JP) .................................. 2006-039346

(51) Int. Cl.
*B32B 9/00* (2006.01)
*B32B 33/00* (2006.01)

(52) U.S. Cl. ..................... 428/40.1; 428/40.2; 428/41.3; 428/41.4; 428/41.8

(58) Field of Classification Search .................. 428/40.1, 428/40.2, 41.3, 41.4, 41.8
See application file for complete search history.

(56) References Cited

U.S. PATENT DOCUMENTS

| | | | | |
|---|---|---|---|---|
| 3,565,247 A * | 2/1971 | Brochman | .................... | 428/40.2 |
| 5,360,833 A | 11/1994 | Eckberg et al. | | |
| 5,670,226 A * | 9/1997 | Yoshizawa et al. | .......... | 428/40.1 |
| 6,451,398 B1 * | 9/2002 | Sylvester | ..................... | 428/41.8 |
| 6,521,309 B1 * | 2/2003 | Chen et al. | .................... | 428/40.1 |
| 7,622,159 B2 * | 11/2009 | Mertz et al. | .................... | 427/447 |
| 7,972,670 B2 * | 7/2011 | Seitz et al. | .................... | 428/40.1 |
| 2002/0155243 A1 | 10/2002 | Kobe et al. | | |
| 2003/0008081 A1 | 1/2003 | Haase | | |
| 2004/0209002 A1 | 10/2004 | Kobe et al. | | |

FOREIGN PATENT DOCUMENTS

| | | |
|---|---|---|
| CN | 1526000 A | 9/2004 |
| EP | 1749867 A2 | 2/2007 |
| GB | 2135903 A | 9/1984 |
| JP | 522537 U | 3/1993 |
| JP | 7-2976 A | 1/1995 |
| JP | 2005-179561 A | 7/2005 |
| JP | 2005-343073 A | 12/2005 |
| WO | 02/062913 A1 | 8/2002 |

OTHER PUBLICATIONS

European Search Report issued Sep. 2, 2010, in corresponding European Patent Application No. 07003352.7.
European Office Action issued on May 5, 2011 in the corresponding European Patent Application No. 07003352.7.
Chinese Office Action issued in corresponding Chinese Patent Application No. 200710084101.1 on Jun. 15, 2011.
Notification of Reasons for Refusal dated Oct. 25, 2011, issued by the Japanese Patent Office in corresponding Japanese Patent Application No. 2006-039346.
Office Action dated Jan. 12, 2012, issued by the State Intellectual Property Office of P.R. China in corresponding Chinese Application No. 200710084101.1.

* cited by examiner

*Primary Examiner* — Patricia Nordmeyer
(74) *Attorney, Agent, or Firm* — Sughrue Mion, PLLC

(57) ABSTRACT

The present invention provides a double-sided pressure-sensitive adhesive tape or sheet including a bubble-containing pressure-sensitive adhesive layer; and a releasable liner protecting a pressure-sensitive adhesive surface of the bubble-containing pressure-sensitive adhesive layer, said releasable liner comprising at least a releasably treated layer formed by an ionizing radiation-curable silicone type releasing agent, in which the releasably treated layer formed by the ionizing radiation-curable silicone type releasing agent is employed onto a pressure-sensitive adhesive surface on the heavier releasable side. The double-sided pressure-sensitive adhesive tape or sheet may employ a bubble-containing pressure-sensitive adhesive layer formed by a bubble-containing pressure-sensitive adhesive composition in the form in which a gas component is mixed in a pressure-sensitive adhesive composition.

12 Claims, No Drawings

DOUBLE-SIDED PRESSURE-SENSITIVE ADHESIVE TAPE OR SHEET

FIELD OF THE INVENTION

The present invention relates to a double-sided pressure-sensitive adhesive tape or sheet having a bubble-containing pressure-sensitive adhesive layer.

BACKGROUND OF THE INVENTION

A double-sided pressure-sensitive adhesive tape or sheet having at least a bubble-containing pressure-sensitive adhesive layer (also referred to as "bubble-containing double-sided pressure-sensitive adhesive tape") has already been in use, and, as an example thereof, a double-sided pressure-sensitive adhesive tape or sheet having a bubble-containing acrylic pressure-sensitive adhesive layer (so-called "acryl foam double-sided pressure-sensitive adhesive tape or sheet) is already known. The bubble-containing double-sided pressure-sensitive adhesive tape, due to bubbles contained in the pressure-sensitive adhesive layer, can exhibit various characteristics different from those of the ordinary double-sided pressure-sensitive adhesive tape or sheet (double-sided adhesive tape or sheet) (see Patent Reference 1).

General structures of the bubble-containing double-sided pressure-sensitive adhesive tape include two constructions, namely a single separator type which utilizes a single releasable liner subjected to releasing treatments on both sides of a base material and in which both pressure-sensitive adhesive surfaces are protected by such single releasable liner in a state wound into a roll, and a double separator type which utilizes two releasable liners each subjected to a releasing treatment on one side of a base material and in which pressure-sensitive adhesive surfaces are protected respectively by the two releasable liners. In the bubble-containing double-sided pressure-sensitive adhesive tape in either construction, in order to prevent so-called "premature separation" phenomenon, the releasing treatment agents (releasing agents) for forming the releasably treated layers of the releasable liner for protecting the pressure-sensitive adhesive surfaces have to be so selected as to generate a difference between the peel strengths on the respective pressure-sensitive adhesive surfaces.

The "premature separation" phenomenon means, in a double-sided pressure-sensitive adhesive tape or sheet (also called "double-sided pressure-sensitive adhesive tape") a situation where the releasable liner protecting the pressure-sensitive adhesive surface is not peeled off at an intended interface but causes a peeling at an interface that should remain adhered (Attached) to the pressure-sensitive adhesive surface. More specifically, it means, in the case of a double-sided pressure-sensitive adhesive tape and in peeling off the releasable liner or in rewinding a required amount from a double-sided pressure-sensitive adhesive tape wound in a roll, a phenomenon that the double-sided pressure-sensitive adhesive tape is peeled at an interface between the releasable liner and the pressure-sensitive adhesive surface which should remain adhered.

In particular, the releasably treated layer at a side having a larger peel strength from the pressure-sensitive adhesive surface (also called "heavier releasing-side releasably treated layer") is required to have a peel strength higher than that in the releasably treated layer at a side having a smaller peel strength from the pressure-sensitive adhesive surface (also called "lighter releasing-side releasably treated layer"), and not to have an unnecessarily high peel strength. When the peel strength of the heavier releasing-side releasably treated layer from the pressure-sensitive adhesive surface is close to the peel strength of the lighter releasing-side releasably treated layer from the pressure-sensitive adhesive surface, it is liable to cause so-called "premature separation" phenomenon. Thus, when the releasable liner is peeled off from the double-sided pressure-sensitive adhesive tape, the tape itself causes damages such as creases or entanglements and becomes practically unusable. On the other hand, when the peel strength of the heavier releasing-side releasably treated layer from the pressure-sensitive adhesive surface becomes high, it may become difficult to peel off the releasable liner from the double-sided pressure-sensitive adhesive tape or, in peeling off the releasable liner, the double-sided pressure-sensitive adhesive tape itself which is adhered by the other pressure-sensitive adhesive surface to another article may be peeled off from such article, thereby resulting deteriorations in the working property or in the working efficiency.

In the ordinary double-sided pressure-sensitive adhesive tapes, it has been tried to cope with such detriments by employing a silicone type releasing agent, particularly a thermally curable silicone type releasing agent, as the releasing treatment agent for forming the heavier releasing-side releasably treated layer in the releasable liner.

Patent Reference 1: JP-A-2005-179561

SUMMARY OF THE INVENTION

However, in the bubble-containing double-sided pressure-sensitive adhesive tape, when the thermally curable silicone type releasing agent employed in the ordinary double-sided pressure-sensitive adhesive tape is used as the releasing treatment agent for constituting the heavier releasing-side releasably treated layer of the releasable liner, it may result in an unnecessarily high peel strength of the releasable liner from the pressure-sensitive adhesive surface, thus deteriorating the working property and the operation efficiency in using the bubble-containing double-sided pressure-sensitive adhesive tape.

In consideration of the foregoing, an object of the present invention is to provide a double-sided pressure-sensitive adhesive tape of which a pressure-sensitive adhesive surface is protected by a releasable liner, capable of maintaining the peel strength of the heavier releasing-side releasably treated layer from the pressure-sensitive adhesive surface at a suitable magnitude enabling an easy peeling, even when a bubble-containing pressure-sensitive adhesive layer is included.

Another object of the present invention is to provide a double-sided pressure-sensitive adhesive tape of which the pressure-sensitive adhesive surface is protected by a releasable liner that can exhibit a significant difference in the peel strength for enabling a peeling at a predetermined interface.

As a result of intensive investigations undertaken by the present inventors, it has been found that, in a bubble-containing double-sided pressure-sensitive adhesive tape, a specified releasing treatment agent, used as the releasing treatment agent for forming the heavier releasing-side releasably treated layer in the releasable liner, allows to maintain the peel strength of the heavier releasing-side releasably treated layer from the pressure-sensitive adhesive surface at a suitable magnitude enabling an easy peeling, and the present invention has thus been made.

DETAILED DESCRIPTION OF THE INVENTION

The present invention relates to a double-sided pressure-sensitive adhesive tape or sheet comprising:

a bubble-containing pressure-sensitive adhesive layer; and a releasable liner protecting a pressure-sensitive adhesive surface of the bubble-containing pressure-sensitive adhesive layer, said releasable liner comprising at least a releasably treated layer formed by an ionizing radiation-curable silicone type releasing agent, wherein the releasably treated layer formed by the ionizing radiation-curable silicone type releasing agent is employed onto a pressure-sensitive adhesive surface on the heavier releasable side.

In the bubble-containing double-sided pressure-sensitive adhesive tape or sheet of the present invention, the bubble-containing pressure-sensitive adhesive layer is preferably formed by a bubble-containing pressure-sensitive adhesive composition in the form in which a gas component is mixed in a pressure-sensitive adhesive composition.

In the bubble-containing double-sided pressure-sensitive adhesive tape or sheet of the present invention, it is preferred that the releasable liner includes a substrate; a releasably treated layer formed by an ionizing radiation-curable silicone type releasing agent on one side of the substrate, which is employed onto a pressure-sensitive adhesive surface on the heavier releasable side; and a releasably treated layer formed by a thermally curable silicone type releasing agent on the other side of the substrate, which is employed onto a pressure-sensitive adhesive surface on the lighter releasable side. Further, a releasable liner, including a substrate and releasably treated layers formed by an ionizing radiation-curable silicone type releasing agent on both sides of the substrate, may be used advantageously.

The ionizing radiation-curable silicone type releasing agent is preferably an ultraviolet light-curable silicone type releasing agent.

In the double-sided pressure-sensitive adhesive tape or sheet above, a peel strength (peeling angle: 180°, tensile speed: 300 mm/min, temperature: 23° C., humidity: 50% RH) on the heavier releasable side of the releasable liner is preferably within a range of from 0.1 to 1.5 N/50 mm.

In the present invention, among the two pressure-sensitive adhesive surfaces in the bubble-containing double-sided pressure-sensitive adhesive tape, a pressure-sensitive adhesive surface that is in contact with the heavier releasing-side releasably treated layer (releasably treated layer having a larger peel strength from the pressure-sensitive adhesive surface) is called "heavier releasable surface", and a pressure-sensitive adhesive surface that is in contact with the lighter releasing-side releasably treated layer (releasably treated layer having a smaller peel strength from the pressure-sensitive adhesive surface) is called "lighter releasable surface".

The bubble-containing double-sided pressure-sensitive adhesive tape of the present invention, having the aforementioned structure, is capable, even containing a bubble-containing pressure-sensitive adhesive layer, of maintaining the peel strength from the pressure-sensitive adhesive surface in the heavier releasing-side releasably treated layer of the releasable liner at a suitable magnitude enabling an easy peeling. Further, the releasably treated layers of the releasable liner can exhibit a significant difference in the peel strengths, realizing peeling at a predetermined interface.

The bubble-containing double-sided pressure-sensitive adhesive tape of the present invention at least contains a bubble-containing pressure-sensitive adhesive layer, and the pressure-sensitive adhesive surfaces thereof are protected by a releasable liner, while the releasable liner includes at least a releasably treated layer formed by an ionizing radiation-curable silicone type releasing agent, and the releasably treated layer formed by the ionizing radiation-curable silicone type releasing agent is employed onto the pressure-sensitive adhesive surface on the heavier releasable side. The bubble-containing double-sided pressure-sensitive adhesive tape may be, for example, a bubble-containing double-sided pressure-sensitive adhesive tape having a structure formed solely of a pressure-sensitive adhesive layer having at least a bubble-containing pressure-sensitive adhesive layer (also called "bubble-containing baseless double-sided pressure-sensitive adhesive tape"), or a bubble-containing double-sided pressure-sensitive adhesive tape having a structure having, on at least one side of a base material, a bubble-containing pressure-sensitive adhesive layer (also called "bubble-containing base-including double-sided pressure-sensitive adhesive tape").

Examples of the bubble-containing baseless double-sided pressure-sensitive adhesive tape include a bubble-containing baseless double-sided pressure-sensitive adhesive tape having a structure in which the pressure-sensitive adhesive layer is formed solely of a bubble-containing pressure-sensitive adhesive layer, and a bubble-containing baseless double-sided pressure-sensitive adhesive tape having a structure in which the pressure-sensitive adhesive layer is constituted of a laminate member of a bubble-containing pressure-sensitive adhesive layer and a pressure-sensitive adhesive layer which does not contain bubbles (also called "bubble-free pressure-sensitive adhesive layer"). Further, examples of the bubble-containing base-including double-sided pressure-sensitive adhesive tape include a bubble-containing base-including double-sided pressure-sensitive adhesive tape having a structure in which bubble-containing pressure-sensitive adhesive layers are formed on both sides of a base material, and a bubble-containing base-including double-sided pressure-sensitive adhesive tape of a structure in which a bubble-containing pressure-sensitive adhesive layer is formed on one side of a base material and a bubble-free pressure-sensitive adhesive layer is formed on the other side of the base material.

The bubble-containing double-sided pressure-sensitive adhesive tape of the invention may have a structure in which the pressure-sensitive adhesive surfaces are protected solely by a single releasable liner subjected to releasing treatments on both sides of a base material (bubble-containing double-sided pressure-sensitive adhesive tape of single separator type), or may have a structure in which the pressure-sensitive adhesive surfaces are protected by two releasable liners, each subjected to a releasing treatment on at least one side of a base material of the releasable liner (bubble-containing double-sided pressure-sensitive adhesive tape of double separator type).

Bubble-Containing Pressure-Sensitive Adhesive Layer

The bubble-containing pressure-sensitive adhesive layer is a pressure-sensitive adhesive layer containing bubbles. The bubble-containing pressure-sensitive adhesive layer can therefore exhibit a satisfactory adhesive property to a curved surface or an irregular surface, and can exhibit a satisfactory repulsion resistance.

Basically, bubbles contained in the bubble-containing pressure-sensitive adhesive layer are preferably those of independent bubble type, but those of independent bubble type and those of continuous bubble type may be present in mixture.

Such bubble usually has a spherical (particularly truly spherical) shape, but may also have a distorted spherical shape. The bubble is not particularly restricted in an average bubble size (diameter), which may be selected within a range of from 1 to 1000 μm (preferably from 10 to 500 μm and more preferably from 30 to 300 μm).

A gas component contained in the bubble (gas component that forms bubble: also called "bubble-forming gas") is not particularly restricted, and may be an inert gas such as nitrogen, carbon dioxide or argon, or various other gas components such as air. It is important that the bubble-forming gas, when a reaction such as a polymerization reaction is executed in a state containing the bubble-forming gas, does not hinder such reaction. The bubble-forming gas is preferably nitrogen in not hindering the reaction and in consideration of cost.

A quantity of the bubbles in the bubble-containing pressure-sensitive adhesive layer is not particularly restricted and may be suitably selected according to the application of the bubble-containing double-sided pressure-sensitive adhesive tape, for example, as 10% or higher (preferably 11% or higher and more preferably 12% or higher) with respect to the entire volume of the bubble-containing pressure-sensitive adhesive layer. An upper limit of the bubble quantity in the bubble-containing pressure-sensitive adhesive layer is not particularly restricted, and may be selected as 50% or less (preferably 40% or less and more preferably 30% or less).

In such bubble-containing pressure-sensitive adhesive layer, the form of bubble formation is not particularly restricted. Examples of the bubble-containing pressure-sensitive adhesive layer include (1) that in a form in which bubbles are formed utilizing a pressure-sensitive adhesive composition mixed in advance with a gas component forming bubbles (bubble-forming gas), and (2) that in a form in which bubbles are formed utilizing a pressure-sensitive adhesive composition containing a foaming agent. In the invention, advantageously employed is a bubble-containing pressure-sensitive adhesive layer in the form in which bubbles are formed utilizing a bubble-containing pressure-sensitive adhesive composition. The bubble quantity in the bubble-containing pressure-sensitive adhesive composition may be suitably selected within a range corresponding to the bubble quantity in the bubble-containing pressure-sensitive adhesive layer.

The pressure-sensitive adhesive constituting the bubble-containing pressure-sensitive adhesive layer is not particularly restricted and may be suitably selected from conventional pressure-sensitive adhesives such as acrylic pressure-sensitive adhesives, rubber pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorinated pressure-sensitive adhesives and epoxy pressure-sensitive adhesives. The pressure-sensitive adhesive may be employed singly or in a combination of two or more kinds.

In the invention, an acrylic pressure-sensitive adhesive may be advantageously employed as the pressure-sensitive adhesive for constituting the bubble-containing pressure-sensitive adhesive layer. The acrylic pressure-sensitive adhesive usually contains, as a base polymer, an acrylic polymer utilizing a (meth)acrylic acid ester as a principal monomer component. As the (meth)acrylic acid ester, a (meth)acrylic acid alkyl ester can be employed advantageously. Examples of such (meth)acrylic acid alkyl ester include (meth)acrylic acid $C_{1-20}$ alkyl esters, such as methyl(meth)acrylate, ethyl(meth)acrylate, propyl(meth)acrylate, isopropyl(meth)acrylate, butyl(meth)acrylate, isobutyl(meth)acrylate, s-butyl(meth)acrylate, t-butyl(meth)acrylate, pentyl(meth)acrylate, isopentyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth)acrylate, isodecyl(meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, heptadecyl(meth)acrylate, octadecyl(meth)acrylate, nonadecyl(meth)acrylate, or eicosyl(meth)acrylate. It is preferably (meth)acrylic acid $C_{2-14}$ alkyl esters, and more preferably (meth)acrylic acid $C_{2-10}$ alkyl esters.

Examples of (meth)acrylic acid esters other than (meth) acrylic acid alkyl esters include (meth)acrylic acid esters having an alicyclic hydrocarbon group such as cyclopentyl (meth)acrylate, cyclhexyl(meth)acrylate, or isobornyl(meth)acrylate, and (meth)acrylic acid esters having an aromatic hydrocarbon group such as phenyl (meth)acrylate.

Such (meth)acrylic acid ester may be employed singly or in a combination of two or more kinds. Since the (meth)acrylic acid ester is employed as a principal monomer component of the acrylic polymer, it is important that the (meth)acrylic acid ester (particularly (meth)acrylic acid alkyl ester) represents a proportion of 60 wt % or higher (preferably 80 wt % or higher) in the entire monomer components for preparing the acrylic polymer.

The acrylic polymer may employ, as the monomer component, various copolymerizable monomers such as a monomer containing a polar group or a polyfunctional monomer. A copolymerizable monomer employed as the monomer component can improve, for example, an adhesive property and a cohesive strength of the pressure-sensitive adhesive. The copolymerizable monomer may be employed singly or in a combination of two or more kinds.

Examples of the monomer containing a polar group include carboxyl group-containing monomers such as (meth)acrylic acid, itaconic acid, maleic acid, fumaric acid, crotonic acid, and isocrotonic acid, and anhydrides thereof (such as maleic anhydride); hydroxyl group-containing monomers including hydroxyalkyl(meth)acrylate such as hydroxyethyl (meth)acrylate, hydroxypropyl(meth)acrylate, and hydroxybutyl(meth)acrylate; amide group-containing monomers such as acrylamide, methacrylamide, N,N-dimethyl(meth)acrylamide, N-methylol(meth)acrylamide, N-methoxymethyl(meth)acrylamide, and N-butoxymethyl(meth)acrylamide; amino group-containing monomers such as aminoethyl (meth)acrylate, dimethylaminoethyl(meth)acrylate, and t-butylaminoethyl(meth)acrylate; glycidyl group-containing monomers such as glycidyl(meth)acrylate, and methylglycidyl(meth)acrylate; cyano group-containing monomers such as acrylonitrile and methacrylonitrile; N-vinyl-2-pyrrolidone; (meth)acryloylmorpholine; and heterocyclic group-containing monomers such as N-vinylpyridine, N-vinylpiperidone, N-vinylpyrimidine, N-vinylpiperazine, N-vinylpyrazine, N-vinylpyrrole, N-vinylimidazole, N-vinylimidazole, and N-vinyloxazole. As the polar group-containing monomer, preferred is a carboxyl group-containing monomer such as acrylic acid or an anhydride thereof.

The amount of the polar group-containing monomer is 30 wt % or less (for example, from 1 to 30 wt %) with respect to the total amount of the monomer components for preparing the acrylic pressure-sensitive adhesive, and preferably from 3 to 20 wt %. When the amount of the polar group-containing monomer exceeds 30 wt % of the total amount of the monomer components for preparing the acrylic pressure-sensitive adhesive, it may result in an excessively high cohesive strength of the acrylic pressure-sensitive adhesive, thereby deteriorating the pressure-sensitive adhesive property of the pressure-sensitive adhesive. Further, an excessively small amount of the polar group-containing monomer (for example, less than 1 wt % of the total amount of the monomer components for preparing the acrylic pressure-sensitive adhesive)

may reduce the cohesive strength of the acrylic pressure-sensitive adhesive, whereby a high shear force cannot be obtained.

Examples of the polyfunctional monomer include hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl(meth)acrylate, vinyl (meth)acrylate, divinylbenzene, epoxy acrylate, polyester acrylate, urethane acrylate, butyl di(meth)acrylate, and hexyl di(meth)acrylate.

The amount of the polyfunctional monomer is 2 wt % or less (for example, from 0.01 to 2 wt %) with respect to the total amount of the monomer components for preparing the acrylic pressure-sensitive adhesive, and preferably from 0.02 to 1 wt %. When the amount of the polyfunctional monomer exceeds 2 wt % of the total amount of the monomer components for preparing the acrylic pressure-sensitive adhesive, it may result in an excessively high cohesive strength of the acrylic pressure-sensitive adhesive, thereby deteriorating the pressure-sensitive adhesive property. Further, an excessively small amount of the polyfunctional monomer (for example, less than 0.01 wt % of the total amount of the monomer components for preparing the acrylic pressure-sensitive adhesive) may reduce the cohesive strength of the acrylic pressure-sensitive adhesive.

Examples of the copolymerizable monomer other than the polar group-containing monomer and the polyfunctional monomer include vinyl esters such as vinyl acetate and vinyl propionate; aromatic vinyl compounds such as styrene and vinyltoluene; olefines and dienes such as ethylene, butadiene, isoprene and isobutylene; vinyl ethers such as vinyl alkyl ether; vinyl chloride; alkoxyalkyl(meth)acrylate monomer such as methoxyethyl(meth)acrylate and ethoxyethyl(meth)acrylate; sulfone group-containing monomers such as sodium vinylsulfonate; phosphoric acid group-containing monomers such as 2-hydroxyethylacryloyl phosphate; imide group-containing monomers such as cyclohexylmaleimide and isopropylmaleimide; isocyanate group-containing monomers such as 2-methacryloyloxyethyl isocyanate; fluorine atom-containing (meth)acrylates; and silicon atom-containing (meth)acrylates.

According to the invention, in the preparation of acrylic polymer, a curing reaction by an actinic energy ray or heat utilizing a polymerization initiator such as a thermal polymerization initiator or a photopolymerization initiator (photoinitiator) may be employed. Thus the acrylic pressure-sensitive adhesive composition may contain a polymerization initiator such as a thermal polymerization initiator or a photopolymerization initiator. Therefore, the acrylic pressure-sensitive adhesive composition can be cured by heat or an actinic energy ray. Presence of such polymerization initiator (thermal polymerization initiator or photopolymerization initiator) enables a curing by heat or by an actinic energy ray. Therefore, by forming the bubble-containing pressure-sensitive adhesive layer by curing in a state containing bubbles, the bubble-containing pressure-sensitive adhesive layer having a structure stably containing the bubbles may be easily formed.

As the polymerization initiator, a photopolymerization initiator can be used advantageously, for example, due to an advantage of reducing the polymerization time. It is thus preferable to utilize a polymerization employing an actinic energy ray, in order to form the bubble-containing pressure-sensitive adhesive layer having a stable bubble structure. The polymerization initiator may be employed singly or in a combination of two or more kinds.

The photopolymerization initiator is not particularly restricted, and may be, for example, a benzoin ether type photopolymerization initiator, an acetophenone type photopolymerization initiator, an α-ketol type photopolymerization initiator, an aromatic sulfonyl chloride type photopolymerization initiator, a photoactive oxime type photopolymerization initiator, a benzoin type photopolymerization initiator, a benzyl type photopolymerization initiator, a benzophenone type photopolymerization initiator, a ketal type photopolymerization initiator or a thioxanthone type photopolymerization initiator.

More specifically, examples of benzoin ether type photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one, and anisole methyl ether. Examples of acetophenone photopolymerization initiator include 2,2-diethoxyacetophenone, 2,2-dimethoxy-2-phenylacetophenone, 1-hydroxycyclohexyl phenyl ketone, 4-phenoxydichloroacetophenone, and 4-t-butyl-dichloroacetophenone. Examples of α-ketol type photopolymerization initiator include 2-methyl-2-hydroxypropiophenone, and 1-[4-(2-hydroxyethyl)-phenyl]-2-hydroxy-2-methylpropan-1-one. Examples of aromatic sulfonyl chloride photopolymerization initiator include 2-naphthalenesulfonyl chloride. Examples of photoactive oxime type photopolymerization initiator include 1-phenyl-1,1-propanedione-2-(o-ethoxycarbonyl)oxime.

Examples of benzoin type photopolymerization initiator include benzoin. Examples of benzyl type photopolymerization initiator include benzyl. Examples of benzophenone type photopolymerization initiator include benzophenone, benzoylbenzoic acid, 3,3'-dimethyl-4-methoxybenzophenone, polyvinylbenzophenone, and α-hydroxycyclohexyl phenyl ketone. Examples of ketal type photopolymerization initiator include benzyl dimethyl ketal. Examples of thioxanthone type photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diixopropylthioxanthone, and dodecylthioxanthone.

The amount of the photopolymerization initiator is not particularly restricted, and may be selected, for example, within a range of from 0.01 to 5 parts by weight (preferably from 0.05 to 3 parts by weight) with respect to 100 parts by weight of all the monomer components for preparing the acrylic polymer.

For activating the photopolymerization initiator, it is important to irradiate the acrylic pressure-sensitive adhesive composition with an actinic energy ray. Examples of such actinic energy ray include ionizing radiations such as α-ray, β-ray, γ-ray, a neutron beam or an electron beam, and an ultraviolet light, among which an ultraviolet light is particularly preferred. The actinic energy ray is not particularly restricted in an irradiating energy, an irradiating time and an irradiating method, so long as the photopolymerization initiator can be activated to induce reaction of the monomer components.

Examples of the thermal photopolymerization initiator include azo type photopolymerization initiators such as 2,2'-azobisisobutyronitrile, 2,2'-azobis-2-methylbutyronitrile, dimethyl 2,2'-azobis(2-methylpropionate), 4,4'-azobis-4-cyanovalerianic acid, azobisisovaleronitrile, 2,2'-azobis(2-amidinopropane) dihydrochloride, 2,2'-azobis[2-(5-methyl-2-imidazolin-2-yl)propane]dihydrochloride, 2,2'-azobis(2-methylpropionamidine) disulfate, and 2,2'-azobis(N,N'- dimethylenisobutylamidine) dihydrochloride; peroxide type photopolymerization initiators such as dibenzoyl peroxide and tert-butyl permaleate; and redox type photopolymerization initiators. The amount of the thermal photopolymerization initiator is not particularly restricted and may be selected within an ordinary range of use of the prior thermal photopolymerization initiator.

The pressure-sensitive adhesive (for example, acrylic pressure-sensitive adhesive) constituting the bubble-containing pressure-sensitive adhesive layer may contain hollow microspheres. Use of hollow microspheres allows to improve, for example, a pressure-sensitive adhesive shearing force in the bubble-containing pressure-sensitive adhesive layer, and a working property. The hollow microspheres may be employed singly or in a combination of two or more kinds.

The hollow microspheres are not particularly restricted in a particle size (average particle size), which may be selected, for example, within a range of from 1 to 500 µm (preferably from 5 to 200 µm and more preferably from 10 to 100 µm).

The hollow microspheres may be inorganic hollow microspheres or organic hollow microspheres. Among the hollow microspheres, examples of inorganic hollow microspheres include hollow balloons made of glass such as hollow glass balloons; hollow balloons made of a metal compound such as hollow alumina balloons; and hollow balloons made of a porcelain material such as hollow ceramic balloons. Further, examples of the organic hollow microspheres include hollow balloons made of a resin such as hollow vinylidene chloride balloons.

The specific gravity of the hollow microspheres is not particularly restricted and may be selected, for example, within a range of from 0.1 to 0.8 g/cm$^3$ (preferably from 0.12 to 0.5 g/cm$^3$). A specific gravity less than 0.1 g/cm$^3$ enhances floating of the hollow microspheres in mixing the hollow microspheres in the pressure-sensitive adhesive for forming the bubble-containing pressure-sensitive adhesive layer, whereby it becomes difficult to disperse the hollow microspheres uniformly. On the other hand, with a specific gravity exceeding 0.8 g/cm$^3$, the hollow microspheres become expensive, thereby elevating the cost.

The hollow microspheres may be subjected to various surface treatments such as a surface tension reducing treatment by a silicone compound or a fluorine-containing compound.

The amount of the hollow microspheres is not particularly restricted, and may be selected, for example, within a range representing 10 to 50 vol. %, preferably 15 to 40 vol. % with respect to the total volume of the bubble-containing pressure-sensitive adhesive layer. An amount of the hollow microspheres representing less than 10 vol. % of the total volume of the bubble-containing pressure-sensitive adhesive layer reduces the effect of addition of the hollow microspheres, while an amount exceeding 50 vol. % reduces the adhesive power of the bubble-containing pressure-sensitive adhesive layer.

The pressure-sensitive adhesive constituting the bubble-containing pressure-sensitive adhesive layer may contain appropriate additives, according to the application of the bubble-containing double-sided pressure-sensitive adhesive tape. Examples of such additives include a surfactant such as an ionic surfactant, a silicone type surfactant, or a fluorinated surfactant; a crosslinking agent such as a polyisocyanate type crosslinking agent, a silicone type crosslinking agent, an epoxy crosslinking agent, or an alkyl etherified melamine crosslinking agent; a material providing a pressure-sensitive adhesive property such as a solid, semi-solid or liquid material at the normal temperature, formed from a rosin-derivative resin, a polyterpene resin, a petroleum resin, or an oil-soluble phenolic resin; a plasticizer; a filler; an antiaging agent; an antioxidant; and a colorant such as a pigment or a dye.

For example, in the case of forming a bubble-containing pressure-sensitive adhesive layer by utilizing a photopolymerization initiator, a pigment (coloring pigment) may be used in such an extent not hindering the photopolymerization reaction, in order to color the bubble-containing pressure-sensitive adhesive layer. When a black color is desired for the bubble-containing pressure-sensitive adhesive layer, carbon black may be used as the coloring pigment. In consideration of the level of coloring and in order not to hinder the photopolymerization reaction, the amount of carbon black is preferably selected within a range of 0.15 parts by weight or less (for example, from 0.001 to 0.15 parts by weight), preferably from 0.02 to 0.1 parts by weight, with respect to 100 parts by weight of all the monomer components for forming the base polymer of the pressure-sensitive adhesive constituting the bubble-containing pressure-sensitive adhesive layer (particularly, all the monomer components for forming the acrylic polymer containing a (meth)acrylic acid ester as the principal monomer component).

In the case that the bubble-containing pressure-sensitive adhesive layer is in the form in which bubbles are formed by employing a pressure-sensitive adhesive composition containing a foaming agent, such foaming agent is not particularly restricted and may be selected from conventional ones. The foaming agent can be, for example, thermally inflatable microspheres.

In the invention, in the case that the bubble-containing pressure-sensitive adhesive layer is in the form in which bubbles are formed by employing a bubble-containing pressure-sensitive adhesive composition, it is preferable, in order to mix the bubbles stably in the bubble-containing pressure-sensitive adhesive layer, to blend and mix the bubbles as a final component to be blended in the bubble-containing pressure-sensitive adhesive composition, and it is particularly preferable to increase the viscosity of the pressure-sensitive adhesive constituting the bubble-containing pressure-sensitive adhesive layer (such adhesive being also called "bubble-containing pressure-sensitive adhesive precursor") prior to the mixing of bubbles. The viscosity of the bubble-containing pressure-sensitive adhesive precursor is not particularly restricted so long as it can stably sustain the mixed bubbles, and a viscosity measured with a BH viscometer under conditions of rotor: No. 5, revolution: 10 rpm, and a measuring temperature: 30° C. is desirably within a range of from 5 to 50 Pa·s (preferably from 10 to 40 Pass). When the viscosity of the bubble-containing pressure-sensitive adhesive precursor (measured with BH viscometer, rotor: No. 5, revolution: 10 rpm and measuring temperature: 30° C.) is less than 5 Pa·s, the mixed bubbles may be soon united and may escape from the system because of the excessively low viscosity. On the other hand, when the viscosity exceeds 50 Pa·s, it is difficult to form the bubble-containing pressure-sensitive adhesive layer because of the excessively high viscosity.

The viscosity of the bubble-containing pressure-sensitive adhesive precursor may be regulated, for example, by a method of blending various polymer components such as acryl rubber or a viscosifying additive, or a method of partially polymerizing the monomer component for forming the base polymer of the pressure-sensitive adhesive (for example, a monomer component such as (meth)acrylic acid ester for forming the acrylic polymer). For example, a bubble-containing pressure-sensitive adhesive precursor having an appropriate viscosity capable of stably containing the bubbles may be obtained by mixing a monomer component for forming the base polymer of the pressure-sensitive adhesive (for example, a monomer component such as (meth)acrylic acid ester for forming the acrylic polymer) and a polymerization initiator such as a photopolymerization initiator to prepare a monomer mixture, then executing a polymerization reaction according to the type of the polymerization initiator on the monomer mixture to obtain a composition (syrup) in which a part only of the monomer components is polymerized, and blending hollow microspheres and various additives to the syrup, according to the necessity. A bubble-containing pressure-sensitive adhesive composition, stably containing the bubbles, can be obtained by introducing and mixing bubbles into such bubble-containing pressure-sensitive adhesive precursor. In the preparation of the syrup, the hollow microspheres and various additives, to be employed according to the necessity, may be suitably added in advance in the monomer mixture.

The bubble mixing method is not particularly restricted, and may utilize a conventional bubble mixing method. For example, there may be employed an apparatus equipped with a stator having a plurality of teeth on a disc having a penetrating hole in the center, and a rotor opposed to the toothed stator and having similar teeth on a disc. A bubble-containing pressure-sensitive adhesive composition, in which bubble-forming gas is finely dispersed and mixed in the bubble-containing pressure-sensitive adhesive precursor, can be obtained by introducing the bubble-containing pressure-sensitive adhesive precursor between the teeth of the stator and the teeth of the rotor of such apparatus, and, under a high-speed rotation of the rotor, introducing a gas component for forming bubbles (bubble-forming gas) through the penetrating hole into the bubble-containing pressure-sensitive adhesive precursor.

In order to suppress or prevent uniting of bubbles, it is preferable to execute steps from the bubble mixing to the formation of the bubble-containing pressure-sensitive adhesive layer as a continuous process. More specifically, it is preferable, after the preparation of the bubble-containing pressure-sensitive adhesive composition by mixing the bubbles as described above, to continuously prepare the bubble-containing pressure-sensitive adhesive layer utilizing such bubble-containing pressure-sensitive adhesive composition and employing a conventional method for forming a pressure-sensitive adhesive layer. More specifically, the bubble-containing pressure-sensitive adhesive layer can be prepared, for example, by coating the bubble-containing pressure-sensitive adhesive composition on a predetermined surface, followed by an optional drying or curing. In forming the bubble-containing pressure-sensitive adhesive layer, it is preferable, as described above, to execute curing by heating or by an irradiation with an actinic energy ray. More specifically, the bubble-containing pressure-sensitive adhesive layer can be prepared advantageously by employing a bubble-containing pressure-sensitive adhesive composition containing a polymerization initiator such as a thermal polymerization initiator or a photopolymerization initiator, coating the bubble-containing pressure-sensitive adhesive composition on a predetermined surface, and executing a heating or an irradiation with an actinic energy ray to achieve curing in state stably retaining the bubbles.

The bubble-containing pressure-sensitive adhesive layer may be of a single layer structure or a laminar structure. Further, a thickness of the bubble-containing pressure-sensitive adhesive layer is not particularly restricted, and may be selected, for example, within a range of from 200 to 5000 µm (preferably from 300 to 4000 µm and more preferably from 400 to 3000 µm). When the thickness of the bubble-containing pressure-sensitive adhesive layer is less than 200 µm, the cushioning property is decreased, whereby the adhesive property to a curved or irregular surface is lowered. On the other hand, when the thickness exceeds 5000 µm, it is difficult to obtain a layer of a uniform thickness.

In the bubble-containing double-sided pressure-sensitive adhesive tape of the invention, a foaming degree (%) in the bubble-containing pressure-sensitive adhesive layer, which is defined by the following formula (1), is for example 10% or higher (preferably 11% or higher and more preferably 12% or higher). An upper limit of the foaming degree is not particularly restricted, and may be selected, for example, as 50% or less (preferably 40% or less and more preferably 30% or less).

$$\text{foaming degree (\%)} = (1 - B/A) \times 100 \quad (1)$$

In the formula (1), A represents a specific gravity of a pressure-sensitive adhesive layer not containing bubbles (bubble-free pressure-sensitive adhesive layer), which is obtained by curing a pressure-sensitive adhesive not containing bubbles, and B represents a specific gravity of a bubble-containing pressure-sensitive adhesive layer which is obtained by curing a pressure-sensitive adhesive containing bubbles. The pressure-sensitive adhesive compositions relating to A and B have a same formulation except for the presence or absence of bubbles.

Base Material

In the case that the bubble-containing double-sided pressure-sensitive adhesive tape of the invention is a bubble-containing base-including double-sided pressure-sensitive adhesive tape, the base material is not particularly restricted and may be a suitable thin sheet-like member, for example, a paper type base material such as paper; a fibrous base material such as a cloth, a non-woven cloth or a net (raw material therefor being not particularly restricted and suitably selectable, for example, from Manila hemp, rayon, polyester and pulp fiber); a metallic base material such as a metal foil or a metal plate; a plastic base material such as a plastic film or a plastic sheet; a rubber base material such as a rubber sheet; a foamed member such as a foamed sheet; or a laminate thereof such as a laminate of a plastic base material and another base material or a laminate of plastic films (or sheets). As the base material, a plastic base material such as a plastic film or a plastic sheet can be employed advantageously. Examples of the material for such plastic film or sheet include olefin resins utilizing α-olefin as a monomer component, such as polyethylene (PE), polypropylene (PP), an ethylene-propylene copolymer, and an ethylene-vinyl acetate copolymer (EVA); polyester resins such as polyethylene terephthalate (PET), polyethylene naphthalate (PEN), and polybutlene terephthalate (PBT); polyvinyl chloride (PVC); vinyl acetate resins; polyphenylene sulfide (PPS); amide resins such as polyamide (nylon) and all-aromatic polyamide (aramide); polyimide resins; and polyether ether ketone (PEEK). Such materials may be employed singly or in a combination of two or more kinds.

In the case of employing a plastic base material as the base material, a deformability such as elongation may be controlled, for example, by a stretching treatment. Further, in the case that the bubble-containing pressure-sensitive adhesive layer is formed by a curing with an actinic energy ray, it is preferable to employ a base material which does not hinder transmission of the actinic energy ray.

In order to increase the adhesion with the bubble-containing pressure-sensitive adhesive layer, the surface of the base material may be subjected to an ordinary surface treatment, for example, an oxidizing treatment by a chemical or physical method such as a corona treatment, a chromic acid treatment, an ozone exposure, a flame exposure, a high-voltage shock exposure or an ionizing radiation treatment, and a coating treatment with an undercoating agent or a releasing agent.

The thickness of the base material may be suitably selected according to a strength, a flexibility and a purpose of use, and is generally, for example, 1000 μm or less (such as from 1 to 1000 μm), preferably from 1 to 500 μm and more preferably from 3 to 300 μm, but such ranges are not restrictive. The base material may have a single layer structure or a laminated structure.

Bubble-Free Pressure-Sensitive Adhesive Layer

In the case that the bubble-containing double-sided pressure-sensitive adhesive tape of the invention has a bubble-free pressure-sensitive adhesive layer (for example, in the case that the bubble-containing double-sided pressure-sensitive adhesive tape is a bubble-containing base-including double-sided pressure-sensitive adhesive tape in which a bubble-containing pressure-sensitive adhesive layer is formed on one side of the base material and a bubble-free pressure-sensitive adhesive layer is formed on the other side of the base material), such bubble-free pressure-sensitive adhesive layer may be formed by employing a conventional pressure-sensitive adhesive (such as acrylic pressure-sensitive adhesives, rubber pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorinated pressure-sensitive adhesives or epoxy pressure-sensitive adhesives) and utilizing a conventional method for forming a pressure-sensitive adhesive layer. The thickness of the bubble-free pressure-sensitive adhesive layer is not particularly restricted, and may be suitably selected according to the application and the method of use.

The bubble-containing double-sided pressure-sensitive adhesive tape of the invention may further include another layer such as an intermediate layer or an undercoat layer within an extent not hindering the effect of the present invention.

Releasable Liner

The bubble-containing double-sided pressure-sensitive adhesive tape of the invention utilizes, as described above, at least a releasable liner including at least a releasably treated layer that is formed by an ionizing radiation-curable silicone type releasing agent (ionizing radiation-curable silicone type releasing treatment agent).

Therefore, in the case that the bubble-containing double-sided pressure-sensitive adhesive tape is of a single separator type, the releasable liner can be, for example, (1a) a releasable liner having releasably treated layers which are formed by an ionizing radiation-curable silicone type releasing agent (the layer being also called "radiation-curable silicone type releasably treated layer") on both sides of a substrate, or (1b) a releasable liner having a releasably treated layer which is formed by an ionizing radiation-curable silicone type releasing agent on one side of a substrate and a releasably treated layer which is formed by a releasing agent other than the ionizing radiation-curable silicone type releasing agent (such a releasably treated layer being also called "another releasably treated layer" and such a releasing agent being also called "another releasing agent") on the other side of the substrate. Further, in the case that the bubble-containing double-sided pressure-sensitive adhesive tape is of a double separator type, a combination of two releasable liners can be, for example, (2a) a combination of two releasable liners, each having a radiation-curable silicone type releasably treated layer on at least one side of a substrate, or (2b) a combination of a releasable liner having a radiation-curable silicone type releasably treated layer on at least one side of a substrate and a releasable liner having another releasably treated layer on at least one side of a substrate.

In the bubble-containing double-sided pressure-sensitive adhesive tape of the invention, it is important that the releasable liner is employed in such a form that a heavier releasable-side pressure-sensitive adhesive surface is in contact with the ionizing radiation-curable silicone type releasably treated layer. Therefore, in the case that the bubble-containing double-sided pressure-sensitive adhesive tape is of a single separator type, it is important that the releasable liner is employed in such a form that the radiation-curable silicone type releasably treated layer, formed on at least one side of the substrate, is in contact with the heavier releasable-side pressure-sensitive adhesive surface. On the other hand, in the case that the bubble-containing double-sided pressure-sensitive adhesive tape is of a double separator type, it is important that the releasable liner, having the radiation-curable silicone type releasably treated layer on at least one side of the substrate, is employed in such a form that the radiation-curable silicone type releasably treated layer, formed on at least one side of the substrate, is in contact with the heavier releasable-side pressure-sensitive adhesive surface.

In the present invention, the bubble-containing double-sided pressure-sensitive adhesive tape of single separator type is preferable. Further, the single releasable liner, to be employed in the bubble-containing double-sided pressure-sensitive adhesive tape of single separator type, is preferably a releasable liner having radiation-curable silicone type releasably treated layers on both side of the substrate.

Radiation-Curable Silicone Type Releasably Treated Layer

The radiation-curable silicone type releasing agent for forming the radiation-curable silicone type releasably treated layer is not particular restricted so long as it is a silicone releasing agent that can be cured by an ionizing radiation such as α-ray, β-ray, γ-ray, a neutron beam, an electron beam, or an ultraviolet light, but advantageously employable is an ultraviolet-curable silicone type releasing agent, which is cured by a crosslinking (curing reaction) by an ultraviolet irradiation, thereby forming a releasing film. The radiation-curable silicone type releasing agent may be employed singly, or in a combination of two or more kinds.

The radiation-curable silicone type releasing agent is not particularly restricted so long as it is a silicone type releasing agent that can be cured by an ultraviolet irradiation, and such agents of various curing types (curing mechanisms) may be utilized. Examples of such curing type include a cationic polymerization type that is cured by a cationic polymerization, a radical polymerization type that is cured by a radical polymerization, a radical addition type that is cured by a radical polyaddition, and a hydrosilylation reaction type that is cured by a hydrosilylation reaction. For the curing type of the radiation-curable silicone type releasing agent, the cationic polymerization type is particularly advantageous. Thus, as the ultraviolet-curable silicone releasing agent, a cationic polymerizable ultraviolet-curable silicone releasing agent can be employed advantageously.

In the cationic polymerizable ultraviolet-curable silicone releasing agent, an epoxy-functional silicone polymer component employing, in the main chain thereof, a polysiloxane component in which one or more epoxy-functional organic groups are introduced, is employed. Such an epoxy-functional silicone polymer component can be employed singly or a combination of two or more kinds. The epoxy-functional organic group may be bonded, either directly or via a divalent group (for example, a divalent organic group such as an alkylene group or an alkyleneoxy group), to a silicon atom in the main chain or the side chain of the polysiloxane component. It is important that at least two epoxy-functional organic groups are introduced into the polysiloxane component of the main chain.

In the radiation-curable silicone type releasing agent, specific examples of the epoxy-functional organic group include a glycidyl group, a glycidoxy group (glycidyloxy group), a 3,4-epoxycyclohexyl group, and a 2,3-epoxycyclopentyl group.

The epoxy-functional silicone polymer component can be obtained, for example, by an addition reaction, on polymethylhydrogen siloxane constituting a base polymer, of an olefinic epoxy monomer such as 4-vinylcyclohexene oxide, allyl glycidyl ether or 7-epoxy-1-octene utilizing a catalyst such as a platinum compound. The epoxy-functional silicone polymer component may have either one a linear form and a branched form, or a mixture thereof.

Further, the cationic polymerizable ultraviolet-curable silicone releasing agent may employ, as an ultraviolet-cleavable initiator (photopolymerization initiator), an onium salt type ultraviolet-cleavable initiator. The onium salt type ultraviolet-cleavable initiator may be employed singly or in a combination of two or more kinds.

Examples of the onium salt type ultraviolet-cleavable initiator include an onium salt photoinitiator described in JP-A-6-32873, an onium salt photoinitiator described in JP-A-2000-281965, an onium salt photoinitiator described in JP-A-11-228702, and an onium salt photoinitiator described in JP-B-8-26120. Examples of such an onium salt ultraviolet-cleavable initiator include diaryliodonium salt, triarylsulfonium salt, triarylselenonium salt, tetraarylphosphonium salt, and aryldiazonium salt. As the onium salt ultraviolet-cleavable initiator, a diaryliodinium salt can be employed advantageously.

More specifically, examples of diaryliodonium salt include a compound represented by $Y_2I^+X^-$, in which Y represents an aryl group that may have a substituent; and $X^-$ represents a non-nucleophilic and non-basic anion. Examples of the non-nucleophilic and non-basic anion represented by $X^-$ include $SbF_6^-$, $SbCl_6^-$, $BF_4^-$, $[B(C_6H_5)_4]^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$, $AsF_6^-$, $PF_6^-$, $HSO_4^-$, and $ClO_4^-$. For such anion, an antimony-based anion or a boron-based anion is advantageous.

Also, examples of triarylsulfonium salt, triarylselenonium salt, tetraarylphosphonium salt, and aryldiazonium salt include compounds corresponding to the diaryliodinium salt. More specifically, as the triarylsulfonium salt, triarylselenonium salt, tetraarylphosphonium salt, and aryldiazonium salt, there can be employed compounds respectively represented by $Y_3S^+X^-$, $Y_3Se^+X^-$, $Y_4P^+X^-$, and $YN_2^+X^-$, wherein Y and $X^-$ have the same meanings as above.

As the onium salt type ultraviolet-cleavable initiator, an ultraviolet-cleavable initiator containing an antimony atom (antimony type ultraviolet-cleavable initiator) and an ultraviolet-cleavable initiator containing a boron atom (boron type ultraviolet-cleavable initiator) can be employed advantageously, and, in particular, a diaryliodonium salt type ultraviolet-cleavable initiator containing an antimony atom and a diaryliodonium salt type ultraviolet-cleavable initiator containing a boron atom can be employed advantageously.

Therefore, examples of the cationic polymerizable ultraviolet-curable silicone releasing agent include the one containing at least a polysiloxane component having at least two epoxy-functional organic groups within a molecule (epoxy-functional silicone polymer component) and an onium salt type ultraviolet-cleavable initiator. In the cationic polymerizable ultraviolet-curable silicone releasing agent, the proportion of the onium salt type ultraviolet-cleavable initiator is not particularly restricted so long as it is in a catalytic amount, but can be selected, for example, within a range of from 0.1 to 8 parts by weight (preferably from 0.3 to 5 parts by weight and more preferably from 0.5 to 3 parts by weight), with respect to 100 parts by weight of the epoxy-functional silicone polymer component.

The cationic polymerizable ultraviolet-curable silicone releasing agent can be prepared by mixing the aforementioned constituents (epoxy-functional silicone polymer component, and optional onium salt type ultraviolet-cleavable initiator and various additives), utilizing an organic solvent according to the necessity. The cationic polymerizable ultraviolet-curable silicone releasing agent may be used in a state where the polymer component such as the epoxy-functional silicone polymer component is dissolved in a solvent such as an organic solvent. In the cationic polymerizable ultraviolet-curable silicone releasing agent, conventional or common additives including a filler, an antistatic, an antioxidant, a plasticizer, a colorant such as a dye or a pigment may be suitably blended.

Such cationic polymerizable ultraviolet-curable silicone releasing agent is also commercially available, for example, under trade names of X-62-7622 (manufactured by Shin-etsu Chemical Co.), X-62-7629 (manufactured by Shin-etsu Chemical Co.), X-62-7655 (manufactured by Shin-etsu Chemical Co.), X-62-7634 (manufactured by Shin-etsu Chemical Co.), and X-62-7658 (manufactured by Shin-etsu Chemical Co.).

The radiation-curable silicone type releasably treated layer can be formed employing an ionizing radiation-curable silicone type releasing agent and utilizing a conventional forming method for a releasable treated layer. More specifically, the ionizing radiation-curable silicone type releasably treated layer can be formed, for example, by coating an ionizing radiation-curable silicone type releasing agent on a predetermined surface of a substrate (substrate for releasable liner) with such a coating amount as to obtain a predetermined thickness after drying or curing, followed by executing an optional drying by heating and then executing a curing by an irradiation with an ionizing radiation such as ultraviolet light.

The irradiating method of the ionizing radiation is not particularly restricted, and may be suitably selected from conventional irradiating methods of the ionizing radiation (for example, an ultraviolet light irradiating method utilizing a conventional ultraviolet lamp, such as a high pressure mercury lamp having electrodes, an ozoneless lamp, a metal halide lamp, or an electrodeless microwave lamp).

Further, the ionizing radiation-curable silicone type releasing agent has to be coated with an appropriate coating amount on the substrate for the releasable liner. An excessively low coating amount of the releasing agent increases the peel strength (force required for peeling) beyond a required peel strength, thereby resulting in a problem in the practical use, while an excessively high coating amount elevates the cost, thus becoming disadvantageous economically. An appropriate coating amount (solid) of the releasing agent may be suitably selected according to the type of the pressure-sensitive adhesive to be used, the type of the substrate for the releasable liner and the type of the ionizing radiation-curable silicone type releasing agent, but is, for example, about from 0.01 to 10 $g/m^2$, preferably from 0.05 to 5 $g/m^2$ and more preferably from 0.1 to 3 $g/m^3$.

In coating the ionizing radiation-curable silicone type releasing agent on the substrate for the releasable liner, a conventional coating apparatus such as a direct gravure coater, an offset gravure coater, a roll coater, a bar coater or a die coater may be suitably selected and used. Also in coating the ionizing radiation-curable silicone type releasing agent on the substrate for the releasable liner, it may be coated in a state diluted in a solvent (such as an organic solvent) or in a solvent-free state not diluted in a solvent (such as an organic solvent).

Substrate for Releasable Liner

The releasable liner employed in the bubble-containing double-sided pressure-sensitive adhesive tape of the invention includes a substrate for the releasable liner. The substrate for releasable liner is not particularly restricted, and various substrates such as a plastic type substrate, a paper type substrate and a fibrous substrate. The substrate for releasable liner may have a single layer structure or a laminated structure. Among the substrates for releasable liner, the plastic type substrate may be suitably selected from various plastic substrates, of which examples include polyolefin-substrates (such as polyethylene substrate and polypropylene substrate), polyester substrates (such as polyethylene terephthalate substrate, polyethylene naphthalate substrate, and polybutylene terephthalate substrate), polyamide substrates (so-called "nylon" type substrate), and cellulose substrates (so-called "cellophane" type substrate). Further, the paper type substrates can be suitably selected from various paper substrates, of which examples include Japanese paper, plain paper, bond paper, glassine paper, craft paper, clupack paper, crepe paper, clay coated paper, top coated paper and synthetic paper.

The substrate for releasable liner may be optionally subjected to various surface treatment such as a corona discharge treatment, or various surface workings such as embossing.

The thickness of the substrate for releasable liner is not particularly restricted but can be suitably selected according to the purpose of use, and is usually selected from a range of from 2 to 200 µm, preferably from 25 to 150 µm.

Another Releasably Treated Layer

The releasing agent (another releasing agent) for forming another releasably treated layer is not particularly restricted and may be suitably selected from conventional releasing agents. Such another releasing agent may be employed singly or in a combination of two or more kinds.

As another releasing agent, a silicone type releasing agent other than the ionizing radiation-curable silicone type releasing agent may be employed advantageously. Such silicone type releasing agent may be of a type not cured by heat or by an ionizing radiation, but a thermally curable silicone type releasing agent can be employed advantageously.

The thermally curable silicone type releasing agent may be any silicone type releasing agent of a type cured by heat, but a silicone releasing agent of a thermal addition reaction type, which is cured by a crosslinking (curing reaction) of a thermal addition reaction to form a releasing film, can be employed advantageously. The thermally curable silicone type releasing agent may be employed singly or in a combination of two or more kinds.

As the silicone releasing agent of thermal addition reaction type, employable is a polysiloxane releasing agent of thermal addition reaction type containing a polysiloxane polymer having, within the molecule thereof, a group which is reactive to a group having a Si—H bond and a polysiloxane polymer having, within the molecule thereof, a hydrogen atom which is bonded to a silicon atom. "Si—H bond" means "a bond between a silicon atom (Si) and a hydrogen atom (H)".

In the polysiloxane polymer having, within the molecule thereof, a group which is reactive to a group having a Si—H bond, examples of the group reactive to a group having a Si—H bond includes alkenyl groups such as a vinyl group and a hexenyl group. The alkenyl group is preferably present in two or more units in the polysiloxane polymer having, within the molecule thereof, a group which is reactive to a group having a Si—H bond. Further, in the polysiloxane polymer having, within the molecule thereof, a hydrogen atom which is bonded to a silicon atom, the hydrogen atom bonded to a silicon atom is preferably present in two or more units within the molecule. Therefore, as the silicone releasing agent of thermal addition reaction type, advantageously employable is a polysiloxane releasing agent which contains a polysiloxane polymer having two or more alkenyl groups within the molecule thereof, and a polysiloxane polymer having two or more hydrogen atoms bonded to silicon atoms within the molecule thereof.

In the polysiloxane polymer having two or more alkenyl groups within the molecule thereof, the alkenyl group is usually bonded directly to a silicon atom of polysiloxane polymer constituting a main chain or a skeleton (for example, a silicon atom at a terminal end or a silicon atom in a main chain). Therefore, as the polysiloxane polymer having two or more alkenyl groups within the molecule thereof, advantageously employable is a polysiloxane polymer having two or more alkenyl groups directly bonded to silicon atoms. Examples of the polysiloxane polymer constituting the main chain or the skeleton include polyalkylalkylsiloxane polymers such as polydimethylsiloxane polymer, polydiethylsiloxane polymer and polymethylethylsiloxane polymer; polyalkylarylsiloxane polymers; and copolymers utilizing plural types of silicon atom-containing monomer components such as poly(dimethylsiloxane-diethylsiloxane), among which polydimethylsiloxane polymer is preferable.

On the other hand, in the polysiloxane polymer having two or more hydrogen atoms bonded to silicon atoms within the molecule thereof, the silicon atom to which hydrogen atom is bonded may be either one of a silicon atom in a main chain and a silicon atom in a side chain. As the polysiloxane polymer having two or more hydrogen atoms bonded to silicon atoms within the molecule thereof, polydimethylhydrogen siloxane polymers such as poly(dimethylsiloxane-methylsiloxane) are preferable. Further, in the polysiloxane releasing agent of thermal addition reaction type, a polysiloxane polymer having, within the molecule thereof, two or more hydrogen atom bonded to silicon atoms has a function as a crosslinking agent.

The amount of the polysiloxane polymer having, within the molecule thereof, two or more hydrogen atoms bonded to silicon atoms is not particularly restricted, and may be suitably selected according to the film curing property and the peel strength. More specifically, in order to sufficiently cure the film, the polysiloxane polymer having, within the molecule thereof, two or more hydrogen atoms bonded to silicon atoms is preferably used in such a proportion that a molar amount (called "molar number (X)") of the silicon atoms to which the hydrogen atoms are bonded (namely silicon atoms in Si—H bonds) in the polysiloxane polymer having, within the molecule thereof, two or more hydrogen atoms bonded to silicon atoms and a molar amount (called "molar number (Y)") of the alkenyl groups in the polysiloxane polymer having, within the molecule thereof, two or more alkenyl groups satisfy a relation in which molar number (X) is larger than molar number (Y), and is normally used in such a proportion that a ratio of molar number (X)/molar number (Y) is within a range from 1.0 to 2.0, preferably from 1.2 to 1.6.

In a case of curing the polysiloxane polymer having, within the molecule thereof, two or more alkenyl groups by the polysiloxane polymer having, within the molecule thereof, two or more hydrogen atoms bonded to silicon atoms (crosslinking agent), a catalyst may be employed. A platinum catalyst such as fine platinum particles, chloroplatinic acid or platinum compounds derived therefrom can be advantageously employed as such catalyst. The amount of the catalyst is not particularly restricted, but can be selected within a range of from 0.1 to 1000 ppm (preferably from 1 to 100 ppm) with respect to the polysiloxane polymer having, within the molecule thereof, two or more alkenyl groups.

The polysiloxane releasing agent of thermal addition reaction type can be prepared by mixing the aforementioned constituents (such as polysiloxane polymer having, within the molecule thereof, two or more alkenyl groups; polysiloxane polymer having, within the molecule thereof, two or more hydrogen atoms bonded to silicon atoms; and optional catalyst and various additives), utilizing an organic solvent according to the necessity. The polysiloxane releasing agent of thermal addition reaction type may be used in a state where the polymer components such as the polysiloxane polymers are dissolved in an organic solvent. In the polysiloxane releasing agent of thermal addition reaction type, conventional or common additives including a filler, an antistatic, an antioxidant, an ultraviolet absorber, a plasticizer, a colorant such as a dye or a pigment may be suitably blended.

Examples of such polysiloxane releasing agent of thermal addition reaction type include LTC-1051L (trade name, manufactured by Toray-Dow-Corning Silicone Co.), X-62-1600A (trade name, manufactured by Shin-etsu Chemical Co.), X-62-1600B (trade name, manufactured by Shin-etsu Chemical Co.), and SP-7268S (trade name, manufactured by Toray-Dow-Corning Silicone Co.).

Another releasably treated layer may be formed employing another releasing agent and utilizing a conventional method for forming a releasably treated layer according to the type of another releasing agent. More specifically, another releasably treated layer can be formed, for example, by coating another releasing agent such as a thermally curable silicone type releasing agent on a predetermined surface of a substrate for releasable liner with such a coating amount as to obtain a predetermined thickness after drying or curing, then executing a drying or curing by heating according to the necessity.

The heating method in drying or curing the thermally curable silicon releasing agent is not particularly restricted, and may be suitably selected from conventional heating methods such as a heating with an electric heater, and a heating by an electromagnetic wave such as infrared light.

Another releasing agent (particularly thermally curable silicone releasing agent) has to be coated with an appropriate coating amount on the substrate (substrate for the releasable liner). An excessively low coating amount of another releasing agent increases the peel strength (force required for peeling) beyond a required peel strength, thereby resulting in a problem in the practical use, while an excessively high coating amount elevates the cost, thus becoming disadvantageous economically. An appropriate coating amount (solid) of another releasing agent may be suitably selected according to the type of the pressure-sensitive adhesive to be used, the type of the substrate for the releasable liner and the type of another releasing agent (particularly thermally curable silicone releasing agent), but is, for example, about from 0.01 to 10 g/m$^2$, preferably from 0.05 to 5 g/m$^2$ and more preferably from 0.1 to 3 g/m$^2$.

In coating another releasing agent (particularly thermally curable silicone releasing agent) on the substrate for the releasable liner, a conventional coating apparatus such as a direct gravure coater, an offset gravure coater, a roll coater, a bar coater or a die coater may be suitably selected and used. Further, in coating another releasing agent on the substrate for the releasable liner, it may be coated in a state diluted in a solvent (such as an organic solvent) or in a solvent-free state not diluted in a solvent (such as an organic solvent).

Form of Bubble-Containing Double-Sided Pressure-Sensitive Adhesive Tape

In the bubble-containing double-sided pressure-sensitive adhesive tape of the invention, a releasable liner having at least a radiation-curable silicone type releasably treated layer is employed as the releasable liner, and the radiation-curable silicone type releasably treated layer is used onto the heavier releasable-side pressure-sensitive adhesive surface. Thus, in the bubble-containing double-sided pressure-sensitive adhesive tape, the releasable liner having at least a radiation-curable silicone type releasably treated layer is used in such a form that the pressure-sensitive adhesive surface on the heavier releasable side is in contact with the radiation-curable silicone type releasably treated layer.

Therefore, in the case that the bubble-containing double-sided pressure-sensitive adhesive tape is of single separator type, a releasable liner having a radiation-curable silicone type releasably treated layer on one side of the substrate and a radiation-curable silicone type releasably treated layer or another releasably treated layer on the other side (for example, releasable liner of (1a) or (1b) described above) can be used in such a manner that the radiation-curable silicone type releasably treated layer on one-side is in contact with the heavier releasable-side pressure-sensitive adhesive surface and that the releasably treated layer (radiation-curable silicone type releasably treated layer or another releasably treated layer) on the other side is in contact with the lighter releasable-side pressure-sensitive adhesive surface. Therefore, the bubble-containing double-sided pressure-sensitive adhesive tape of single separator type usually has a form wound in a roll or a laminated sheet form. The bubble-containing double-sided pressure-sensitive adhesive tape of single separator type, when it is formed as a wound roll, is preferably so wound in a roll that the lighter releasable-side pressure-sensitive adhesive surface is positioned inwards.

Further, in the case that the bubble-containing double-sided pressure-sensitive adhesive tape is of double separator type, for example, a releasable liner having a radiation-curable silicone type releasably treated layer on at least one side of the substrate, and a releasable liner having a radiation-curable silicone type releasably treated layer or another releasably treated layer on at least one side of the substrate (for example, two releasable liners of combination (2a) or (2b) described above) can be used in such a manner that the radiation-curable silicone type releasably treated layer on one releasable liner is in contact with the heavier releasable-side pressure-sensitive adhesive surface and that the releasably treated layer (radiation-curable silicone type releasably treated, layer or another releasably treated layer) on the other releasable liner is in contact with the lighter releasable-side pressure-sensitive adhesive surface. In such a case, the bubble-containing double-sided pressure-sensitive adhesive tape of double separator type may have a form wound in a roll.

In the bubble-containing double-sided pressure-sensitive adhesive tape, the pressure-sensitive adhesive surface at the heavier releasable side is usually a surface of the bubble-containing pressure-sensitive adhesive layer.

Therefore, in the case that the bubble-containing double-sided pressure-sensitive adhesive tape is a bubble-containing baseless double-sided pressure-sensitive adhesive tape, the pressure-sensitive adhesive surface on the heavier releasable side becomes one of the surfaces of bubble-containing pressure-sensitive adhesive layer, and, in the case that the bubble-containing double-sided pressure-sensitive adhesive tape is a bubble-containing base-including double-sided pressure-sensitive adhesive tape, it usually becomes the surface of bubble-containing pressure-sensitive adhesive layer formed on at least one side of the base material.

Producing Method for Bubble-Containing Double-Sided Pressure-Sensitive Adhesive Tape The bubble-containing double-sided pressure-sensitive adhesive tape of the invention can be produced by forming at least a bubble-containing pressure-sensitive adhesive layer, and by protecting the pressure-sensitive adhesive surfaces in such a manner that the pressure-sensitive adhesive surface at the heavier releasable side is in contact with the radiation-curable silicone type releasing agent. For example, in the case that the bubble-containing double-sided pressure-sensitive adhesive tape is a bubble-containing baseless double-sided pressure-sensitive adhesive tape, the producing method therefor can be, for example, a method of coating, on a radiation-curable silicone type releasably treated layer of a releasable liner having at least a radiation-curable silicone type releasably treated layer, a bubble-containing pressure-sensitive adhesive composition to form a bubble-containing pressure-sensitive adhesive layer, or a method of transferring a bubble-containing pressure-sensitive adhesive layer prepared in advance, onto a radiation-curable silicone type releasably treated layer of a releasable liner having at least a radiation-curable silicone type releasably treated layer. Further, in the case that the bubble-containing baseless double-sided pressure-sensitive adhesive tape is a bubble-containing baseless double-sided pressure-sensitive adhesive tape of single separator type, it can be produced by utilizing a releasable liner having a radiation-curable silicone type releasably treated layer on one side and a radiation-curable silicone type releasably treated layer or another releasably treated layer on the other side, followed by forming a bubble-containing pressure-sensitive adhesive layer on the radiation-curable silicone type releasably treated layer, and then winding the tape into a roll or laminating the sheet-shaped tapes. Moreover, in the case that the bubble-containing baseless double-sided pressure-sensitive adhesive tape is a bubble-containing baseless double-sided pressure-sensitive adhesive tape of double separator type, it can be produced by utilizing a releasable liner having at least a radiation-curable silicone type releasably treated layer on one side and a releasable liner having at least a radiation-curable silicone type releasably treated layer or another releasably treated layer on one side, followed by forming a bubble-containing pressure-sensitive adhesive layer on the radiation-curable silicone type releasably treated layer of a releasable liner, and then adhering the other releasable liner to an exposed pressure-sensitive adhesive surface.

In the present invention, the bubble-containing baseless double-sided pressure-sensitive adhesive tape is preferably produced by preparing a bubble-containing pressure-sensitive adhesive layer in advance, followed by transferring such bubble-containing pressure-sensitive adhesive layer onto a radiation-curable silicone type releasably treated layer of a releasable liner having at least a radiation-curable silicone type releasably treated layer. More specifically, in the case that the bubble-containing baseless double-sided pressure-sensitive adhesive tape is a bubble-containing baseless double-sided pressure-sensitive adhesive tape of single separator type, a bubble-containing pressure-sensitive adhesive composition is coated, utilizing a coating device such as a roll coater, on a releasably treated surface of a process separator (for example, a separator having a releasably treated layer on a surface of a polyethylene terephthalate base material) with such a coating amount as to obtain a predetermined thickness after drying or curing, then applying thereon a covering separator (for example, a separator having a releasably treated layer on a surface of a polyethylene terephthalate base material) in such a manner that the releasably treated surface of the covering separator is contacted, and executing an optional curing treatment (for example, an ionizing radiation treatment such as ultraviolet irradiation or a heating treatment), to obtain a bubble-containing pressure-sensitive adhesive layer. Separately, on one side of a substrate for releasable liner, an ionizing radiation-curable silicone type releasing agent is coated with such a coating amount as to obtain a predetermined thickness after drying or curing, then is dried by heating according to the necessity, and is cured by an irradiation with an ionizing radiation (such as ultraviolet light) to form an ionizing radiation-curable silicone type releasably treated layer, and on the other side of the substrate for releasable liner, an ionizing radiation-curable silicone type releasing agent or another releasing agent (such as a thermally curable silicone type releasing agent) is coated with such a coating amount as to obtain a predetermined thickness after drying or curing, and is dried or cured by heating or by an irradiation with an ionizing radiation (such as ultraviolet light) to form a radiation-curable silicone type releasably treated layer or another releasably treated layer, thereby obtaining a releasable liner. Then, the covering separator on the bubble-containing pressure-sensitive adhesive layer is peeled off, and the releasable liner is adhered onto the exposed pressure-sensitive adhesive surface in such a manner that the radiation-curable silicone type releasably treated layer is in contact with the exposed pressure-sensitive adhesive surface, then the process separator is peeled off and the adhesive layer is wound into a roll in such a form that the exposed pressure-sensitive adhesive surface is positioned inwards and is in contact with the other radiation-curable silicone type releasably treated layer or the other releasably treated layer, thereby providing a bubble-containing baseless double-sided pressure-sensitive adhesive tape of single separator type.

On the other hand, in the case that the bubble-containing baseless double-sided pressure-sensitive adhesive tape is a bubble-containing baseless double-sided pressure-sensitive adhesive tape of double separator type, in a similar manner as in the case of a bubble-containing baseless double-sided pressure-sensitive adhesive tape of single separator type, a bubble-containing pressure-sensitive adhesive composition is coated, on a releasably treated surface of a process separator, with such a coating amount as to obtain a predetermined thickness after drying or curing, then applying thereon a covering separator in such a manner that the releasably treated surface thereof is contacted, and executing an optional curing treatment (for example an ionizing-radiation treatment such as ultraviolet irradiation or a heating treatment), to obtain a bubble-containing pressure-sensitive adhesive layer. Separately, on one side of a substrate for releasable liner, an ionizing radiation-curable silicone type releasing agent is coated with such a coating amount as to obtain a predetermined thickness after drying or curing, then is optionally dried by heating, and is cured by an irradiation with an ionizing radiation (such as ultraviolet light) to form an ionizing radiation-curable silicone type releasably treated layer, thereby providing a releasable liner having at least a radiation-curable silicone type releasably treated layer. Further, on one side of a substrate for releasable liner, an ionizing radiation-curable silicone type releasing agent or another releasing agent (such as a thermally curable silicone type releasing agent) is coated with such a coating amount as to obtain a predetermined thickness after drying or curing, and is dried or cured by heating or by an irradiation with an ionizing radiation (such as ultraviolet light) to form a radiation-curable silicone type releasably treated layer or another releasably treated layer, thereby providing a releasable liner having at least a radiation-curable silicone type releasably treated layer or another releasably treated layer. Then, the covering separator on the bubble-containing pressure-sensitive adhesive layer is peeled off, and the releasable liner having at least the radiation-curable silicone type releasably treated layer is adhered onto the exposed pressure-sensitive adhesive surface in such a manner that the radiation-curable silicone type releasably treated layer is in contact with the exposed pressure-sensitive adhesive surface, then the process separator is peeled off and the releasable liner having at least the radiation-curable silicone type releasably treated layer or the other releasably treated layer is adhered to the exposed pressure-sensitive adhesive surface in such a manner that the radiation-curable silicone type releasably treated layer or the other releasably treated layer is in contact with the pressure-sensitive adhesive surface, and the adhesive layer is wound into a roll according to the necessity, thereby providing a bubble-containing baseless double-sided pressure-sensitive adhesive tape of double separator type.

Peel Strength

In the bubble-containing double-sided pressure-sensitive adhesive tape of the invention, the peel strength (peel angle: 180°, tensile speed: 300 mm/min, temperature: 23° C., humidity: 50% RH) of the releasably treated layer of the releasable liner from the pressure-sensitive adhesive surface is not particularly restricted, but the peel strength is preferably such that the radiation-curable silicone type releasably treated layer can be effectively utilized as a releasably treated layer of a heavier releasable side. More specifically, the peel strength (peel angle: 180°, tensile speed: 300 mm/min, temperature: 23° C., humidity: 50% RH) of the radiation-curable silicone type releasably treated layer of the releasable liner from the pressure-sensitive adhesive surface can be suitably selected, for example, within a range of 1.5 N/50 mm or less (for example, from 0.1 to 1.5 N/50 mm), preferably 1.2 N/50 mm or less (for example, from 0.15 to 1.2 N/50 mm), and more preferably 1.0 N/50 mm or less (for example, from 0.2 to 1.0 N/50 mm). A peel strength of the radiation-curable silicone type releasably treated layer exceeding 1.5 N/50 mm will result in deteriorations of working property and operation efficiency in utilizing the bubble-containing double-sided pressure-sensitive adhesive tape. Further, an excessively small peel strength of the radiation-curable silicone type releasably treated layer (for example, less than 0.1 N/50 mm) reduces the difference in the peel strength between the releasably treated layer of the heavier releasable side and that of the lighter releasable side, thus possibly leading to the "premature separation" phenomenon.

It is important that the other releasably treated layer, serving as the releasably treated layer of lighter releasable side, has such a, peel strength that can be effectively utilized in the releasably treated layer of lighter releasable side (namely a peel strength smaller than the peel strength of the radiation-curable silicone type releasably treated layer serving as the releasably treated layer of heavier releasable side). The peel strength (peel angle: 180°, tensile speed: 300 mm/min, temperature: 23° C., humidity: 50% RH) of the other releasably treated layer serving as the releasably treated layer of the heavier releasable side from the pressure-sensitive adhesive surface can be suitably selected, for example, within a range of from 0.01 to 0.3 N/50 mm (preferably from 0.03 to 0.2 N/50 mm and more preferably from 0.05 to 0.15 N/50 mm).

The peel strength of a releasably treated layer from a pressure-sensitive adhesive surface can be determined in the following manner. A bubble-containing double-sided pressure-sensitive adhesive tape, in a state where a releasably treated layer to be subjected to a peel strength measurement and a pressure-sensitive adhesive surface are maintained in contact, is let to stand for one hour in an environment of a room temperature (23° C.) and a humidity of 50% RH. After standing for one hour, and in an environment of a room temperature (23° C.) and a humidity of 50% RH, a tensile tester is used to measure a stress, when the releasable liner, having the releasably treated layer to be subjected to the peel strength measurement, is peeled off in such a manner that the peeling takes place at the interface between the releasably treated layer to be subjected to the peel strength measurement and the pressure-sensitive adhesive layer (bubble-containing pressure-sensitive adhesive layer or bubble-free pressure-sensitive adhesive layer) and, utilizing an auxiliary plate, over a distance of 50 mm with a peel angle of 180° and a tensile speed of 300 mm/min, and a maximum value of the stress is read and taken as the peel strength (N/50 mm) of the releasably treated layer from the pressure-sensitive adhesive surface.

In the bubble-containing double-sided pressure-sensitive adhesive tape of the invention, even containing a bubble-containing pressure-sensitive adhesive layer, the releasable liner is used in such a form that the pressure-sensitive adhesive surface on the heavier releasable side is in contact with the radiation-curable silicone type releasably treated layer, so that the peel strength of the releasably treated layer at the heavier releasable layer from the pressure-sensitive adhesive surface can be maintained at an appropriate magnitude enabling to easily peel off the releasable liner, having the releasably treated layer of the heavier releasable side, at the interface between the releasably treated layer on the heavier releasable side and the bubble-containing pressure-sensitive adhesive layer. Therefore, even in case of utilizing the pressure-sensitive adhesive surface on the heavier releasable side in using the bubble-containing double-sided pressure-sensitive adhesive tape, the pressure-sensitive adhesive surface can be easily exposed and the bubble-containing double-sided pressure-sensitive adhesive tape can be used with excellent working property and operation efficiency.

In the bubble-containing double-sided pressure-sensitive adhesive tape of the invention, owing to the aforementioned constitution, the releasably treated layers can exhibit a significant difference in the peel strength enabling a peeling at the predetermined interface. Therefore, in using the bubble-containing double-sided pressure-sensitive adhesive tape, it is rendered possible to effectively suppress or prevent so-called "premature separation" phenomenon, and to cause peeling at the predetermined interface without causing damages such as creases or entanglements, thereby enabling effective use of the bubble-containing double-sided pressure-sensitive adhesive tape.

Therefore, the bubble-containing double-sided pressure-sensitive adhesive tape can be used as a double-sided pressure-sensitive adhesive tape or sheet to be adhered to a curved or irregular surface, or a double-sided pressure-sensitive adhesive tape or sheet usable in an application requiring a repulsion resistance.

EXAMPLES

In the following, the present invention will be further clarified by examples, but the present invention is not limited thereto.

Preparation of Bubble-Containing Pressure-Sensitive Adhesive Layer

In a monomer mixture of 90 parts by weight of 2-ethylhexyl acrylate and 10 parts by weight of acrylic acid as monomer components, 0.05 parts by weight of Irgacure 651 (trade name, manufacture by Ciba Specialty Chemicals Ltd.) and 0.05 parts by weight of Irgacure 184 (trade name, manufacture by Ciba Specialty Chemicals Ltd.) were blended as photopolymerization initiators, and an ultraviolet (UV) irradiation was executed until the viscosity (BH viscometer, rotor: No. 5, revolution: 10 rpm, measuring temperature: 20° C.) reached about 15 Pa·s to obtain a partially polymerized composition (syrup). Thereafter, as a surfactant, Unidyne TG-656 (trade name; manufactured by Daikin Industries Ltd.; fluorinated surfactant; weight-average molecular weight of fluorinated polymer: 45,900) was added in a solid converted amount of 0.5 parts by weight with respect to 100 parts by weight of all the monomer components (2-ethylhexyl acrylate and acrylic acid) and mixed to obtain a pressure-sensitive adhesive precursor.

The pressure-sensitive adhesive precursor was placed in a beaker, and, under introduction of nitrogen gas from the bottom into the pressure-sensitive adhesive precursor, and bubbles of nitrogen gas were incorporated and mixed in the pressure-sensitive adhesive precursor by a homomixer to obtain a bubble-containing pressure-sensitive adhesive composition.

On a releasably treated surface of a polyethylene terephthalate base material (process separator) subjected to a releasing treatment on a surface thereof, the bubble-containing pressure-sensitive adhesive composition was so coated as to obtain a thickness of 1.0 mm after drying and curing, then a polyethylene terephthalate base material (covering separator) subjected to a releasing treatment on a surface thereof was adhered in such a manner that the releasably treated surface was in contact, and an ultraviolet (UV) irradiation was conducted for 10 minutes at an illumination intensity of 4.0 mW/cm$^2$ to cure the bubble-containing pressure-sensitive adhesive, thereby obtaining a bubble-containing pressure-sensitive adhesive layer.

Preparation Example 1 of Releasing Agent

In 100 parts by weight of X-62-7658 (trade name; manufactured by Shin-etsu Chemical Co.; ultraviolet-curable polydimethylsiloxane), 1 part by weight of an ultraviolet polymerization initiator (ultraviolet-cleavable initiator) CAT7605 (trade name; manufactured by Shin-etsu Chemical Co.) was blended to obtain an ultraviolet-curable silicone type releasing agent (also called "releasing agent (A)") as a radiation-curable silicone type releasing agent.

Preparation Example 2 of Releasing Agent

One hundred parts by weight of LTC-1051L (trade name; manufactured by Toray-Dow-Corning Silicone Co.; thermally curable polydimethylsiloxane) and 10 parts by weight of LTC-1100L (trade name; manufactured by Shin-etsu Chemical Co.; thermally curable polydimethylsiloxane) were blended to obtain a thermally curable silicone type releasing agent (also called "releasing agent (B)").

Preparation Example 3 of Releasing Agent

Fifty parts by weight of X-62-1600A (trade name; manufactured by Shin-etsu Chemical Co.; thermally curable polydimethylsiloxane) and 50 parts by weight of X-62-1600B (trade name; manufactured by Shin-etsu Chemical Co.; thermally curable polydimethylsiloxane) were blended to obtain a thermally curable silicone type releasing agent (also called "releasing agent (C)").

Example 1

On a surface of a paper base material LL80 (trade name; manufactured by Lintec Corp.; a paper base material laminated with a polyethylene base material on both sides (two-side polyethylene-laminated paper)), the releasing agent (A) was coated by a gravure coater with a coating amount of 1.5 g/m$^2$ to obtain an ultraviolet-curable silicone type releasing film. Then the ultraviolet-curable silicone type releasing film was exposed and cured by a Fusion H bulb (illumination intensity: 0.250 J/cm$^2$) under conditions of a focal length of 10 mm and an illumination dose of 2.0 W/cm$^2$ to form a releasably treated layer, and was let to stand (aged) for one day under an environmental temperature of 50° C. The coating speed was selected as 70 m/min.

Then, on the other side of LL80 (trade name), the releasing agent (B) was coated by a gravure coater with a coating amount of 1.5 g/m$^2$ and was introduced at a speed of 140 m/min into a drying oven set at 170° C. (having a length in longitudinal direction (oven length) of 40 m) for curing to form a releasably treated layer, and was let to stand (aged) for one day under an environmental temperature of 50° C., thereby preparing a releasable liner having a structure having a releasably treated layer of an ultraviolet-curable silicone type releasing agent (releasing agent (A)) on one side and a releasably treated layer of a thermally curable silicone type releasing agent (releasing agent (B)) on the other side.

In such releasable liner, the releasably treated layer formed by the releasing agent (A) is used as the releasably treated layer at the heavier releasable side, and the releasably treated layer formed by the releasing agent (B) is used as the releasably treated layer at the lighter releasable side.

Then the covering separator was peeled off from the bubble-containing pressure-sensitive adhesive layer thus obtained, and the releasable liner was adhered to the exposed pressure-sensitive adhesive surface in such a form that the releasably treated layer formed by the releasing agent (A) was in contact. Then the process separator was peeled off and the adhesive layer was wound into a roll in such a form that the exposed pressure-sensitive adhesive surface was positioned inside and was in contact with the releasably treated layer formed by the releasing agent (B), whereby a bubble-containing baseless double-sided pressure-sensitive adhesive tape of single separator type was produced.

Comparative Example 1

On a surface of LL80 (trade name; two-side polyethylene-laminated paper), the releasing agent (C) was coated by a gravure coater with a coating amount of 1.5 g/m$^2$ and was introduced at a speed of 140 m/min into a drying oven set at 170° C. (having a length in longitudinal direction (oven length) of 40 m) for curing to form a releasably treated layer, and was further let to stand (aged) for one day under an environmental temperature of 50° C.

Then, on the other surface of LL80 (trade name), the releasing agent (B) was coated by a gravure coater with a coating amount of 1.5 g/m$^2$ and was introduced at a speed of 140 m/min into a drying oven set at 170° C. (having a length in longitudinal direction (oven length) of 40 m) for curing to form a releasably treated layer, and was let to stand (aged) for one day under an environmental temperature of 50° C., thereby preparing a releasable liner having a structure having a releasably treated layer of a thermally curable silicone type releasing agent (releasing agent (C)) on one side and a releasably treated layer of a thermally curable silicone type releasing agent (releasing agent (B)) on the other side.

In such releasable liner, the releasably treated layer formed by the releasing agent (C) is used as the releasably treated layer at the heavier releasable side, and the releasably treated layer formed by the releasing agent (B) is used as the releasably treated layer at the lighter releasable side.

Then the covering separator was peeled off from the bubble-containing pressure-sensitive adhesive layer obtained by the preparation thereof, and the releasable liner was adhered to the exposed pressure-sensitive adhesive surface in such a form that the releasably treated layer formed by the releasing agent (C) was in contact. Then the process separator was peeled off and the adhesive layer was wound into a roll in such a form that the exposed pressure-sensitive adhesive surface was positioned inside and was in contact with the releasably treated layer formed by the releasing agent (B), whereby a bubble-containing baseless double-sided pressure-sensitive adhesive tape of single separator type was produced.

Evaluation

The bubble-containing baseless double-sided pressure-sensitive adhesive tapes obtained in Example 1 and Comparative Example 1 were subjected, in following measuring methods, to measurement of an initial peel strength and a peel strength after storage, of the releasable liner. Results of measurements are shown in Table 1.

Measuring Method of Initial Peel Strength

Each of the bubble-containing baseless double-sided pressure-sensitive adhesive tapes (width: 50 mm) of Example 1 and Comparative Example 1 was rewound for a length of 150 mm to expose the pressure-sensitive adhesive surface of the lighter releasable side, and such pressure-sensitive adhesive surface was adhered to a stainless steel auxiliary plate. On a tensile tester, the releasable liner was peeled at the interface between the bubble-containing pressure-sensitive adhesive layer and the releasably treated layer of the heavier releasable side, in an environment of room temperature (23° C.) and a humidity of 50% RH and under conditions of a tensile speed of 300 mm/min and a peel angle of 180°, to measure a stress after peeling over 50 mm, and a maximum stress was read and taken as the initial peel strength (N/50 mm).

Measuring Method of Peel Strength After Storage

The bubble-containing baseless double-sided pressure-sensitive adhesive tapes (width: 50 mm) of Example 1 and Comparative Example 1 were stored, in a state wound in a roll, by standing for 14 days under an environment of 50° C.

After the storage, the bubble-containing double-sided pressure-sensitive adhesive tape was rewound for a length of 150 mm to expose the pressure-sensitive adhesive surface of the lighter releasable side, and such pressure-sensitive adhesive surface was adhered to a stainless steel auxiliary plate. On a tensile tester, the releasable liner was peeled at the interface between the bubble-containing pressure-sensitive adhesive layer and the releasably treated layer of the heavier releasable side, in an environment of room temperature (23° C.) and a humidity of 50% RH and under conditions of a tensile speed of 300 mm/min and a peel angle of 180°, to measure a stress after peeling over 50 mm, and a maximum stress was read and taken as the peel strength after storage (N/50 mm).

The storage by standing for 14 days under an environment of 50° C. corresponds to a storage by standing for about one year at the room temperature.

TABLE 1

|  | Initial peel strength (N/50 mm) | Peel strength after storage (N/50 mm) |
| --- | --- | --- |
| Example 1 | 0.63 | 0.70 |
| Comparative Example 1 | 2.00 | 0.93 |

The bubble-containing baseless double-sided pressure-sensitive adhesive tape of Example 1 did not show a large difference between the initial peel strength and the peel strength after storage, and maintained both strengths at an appropriate magnitude. Therefore, in the bubble-containing baseless double-sided pressure-sensitive adhesive tape of Example 1, the releasable liner could be easily peeled, in the practical use, at the interface between the bubble-containing pressure-sensitive adhesive layer and the releasably treated surface of the heavier releasable side.

On the other hand, the bubble-containing baseless double-sided pressure-sensitive adhesive tape of Comparative Example 1 had an initial peel strength of 2.00 N/50 mm. Therefore, in the bubble-containing baseless double-sided pressure-sensitive adhesive tape of Comparative Example 1 immediately after manufacture, the releasable liner was of a level difficult to peel off at the interface between the bubble-containing pressure-sensitive adhesive layer and the releasably treated surface of the heavier releasable side. Further, the bubble-containing baseless double-sided pressure-sensitive adhesive tape of Comparative Example 1 had a peel strength after storage, much smaller than the initial peel strength.

Therefore, double-sided pressure-sensitive adhesive tape of Comparative Example 1 was deficient in stability in time of the peel strength of the releasable liner from the pressure-sensitive adhesive surface.

While the present invention has been described in detail and with reference to specific embodiments thereof, it will be apparent to one skilled in the art that various changes and modifications can be made therein without departing from the scope thereof.

This application is based on Japanese patent application No. 2006-039346 filed Feb. 16, 2006, the entire contents thereof being hereby incorporated by reference.

Further, all the documents described herein are incorporated by reference.

What is claimed is:

1. A double-sided pressure-sensitive adhesive tape or sheet having a first pressure-sensitive adhesive surface and a second pressure-sensitive adhesive surface,
the double-sided pressure-sensitive adhesive tape or sheet comprising:
at least a bubble-containing pressure-sensitive adhesive layer; and
a releasable liner,
said releasable liner comprising a substrate, a heavier releasing-side releasably treated layer formed by an ionizing radiation-curable silicone releasing agent on one side of the substrate, and a lighter releasing-side releasably treated layer on the other side of the substrate,
wherein the heavier releasing-side releasably treated layer is employed onto the first pressure-sensitive adhesive surface and the lighter releasing-side releasably treated layer is employed onto the second pressure-sensitive adhesive surface,
wherein the lighter releasing-side releasably treated layer is formed by a thermally curable silicone releasing agent, and
wherein the tape or sheet is in a roll form.

2. The double-sided pressure-sensitive adhesive tape or sheet according to claim 1, wherein the bubble-containing pressure-sensitive adhesive layer is formed by a bubble-containing pressure-sensitive adhesive composition in the form in which a gas component is mixed in a pressure-sensitive adhesive composition.

3. The double-sided pressure-sensitive adhesive tape or sheet according to claim 1, wherein the lighter releasing-side releasably treated layer is formed by an ionizing radiation-curable silicone releasing agent.

4. The double-sided pressure-sensitive adhesive tape or sheet according to claim 1, wherein the ionizing radiation-curable silicone releasing agent is an ultraviolet light-curable silicone releasing agent.

5. The double-sided pressure-sensitive adhesive tape or sheet according to claim 1, wherein a peel strength (peeling angle: 180°, tensile speed: 300 mm/min, temperature: 23° C., humidity: 50% RH) of the heavier releasing-side releasably treated layer is within a range of from 0.1 to 1.5 N/50 mm.

6. The double-sided pressure-sensitive adhesive tape or sheet according to claim 1, wherein a peel strength (peeling angle: 180°, tensile speed: 300 mm/min, temperature: 23° C., humidity: 50% RH) of the lighter releasing-side releasably treated layer is within a range of from 0.01 to 0.3 N/50 mm.

7. A double-sided pressure-sensitive adhesive tape or sheet having a first pressure-sensitive adhesive surface and a second pressure-sensitive adhesive surface,
the double-sided pressure sensitive adhesive tape or sheet comprising at least a bubble-containing pressure-sensitive adhesive layer, a first releasable liner and a second releasable liner,
said first releasable liner comprising a first substrate and a heavier releasing-side releasably treated layer formed by an ionizing radiation-curable silicone releasing agent on one side of the first substrate,
said second releasable liner comprising a second substrate and a lighter releasing-side releasably treated layer formed on one side of the second substrate,
wherein the heavier releasing-side releasably treated layer is employed onto the first pressure-sensitive adhesive surface and the lighter releasing-side releasably treated layer is employed onto the second pressure-sensitive adhesive surface, and
wherein the lighter releasing-side releasably treated layer is formed by a thermally curable silicone releasing agent.

8. The double-sided pressure-sensitive adhesive tape or sheet according to claim 7, wherein the bubble-containing pressure-sensitive adhesive layer is formed by a bubble-containing pressure-sensitive adhesive composition in the form in which a gas component is mixed in a pressure-sensitive adhesive composition.

9. The double-sided pressure-sensitive adhesive tape or sheet according to claim 7, wherein the lighter releasing-side releasably treated layer is formed by an ionizing radiation-curable silicone releasing agent.

10. The double-sided pressure-sensitive adhesive tape or sheet according to claim 7, wherein the ionizing radiation-curable silicone releasing agent is an ultraviolet light-curable silicone releasing agent.

11. The double-sided pressure-sensitive adhesive tape or sheet according to claim 7, wherein a peel strength (peeling angle: 180°, tensile speed: 300 mm/min, temperature: 23° C., humidity: 50% RH) of the heavier releasing-side releasably treated layer is within a range of from 0.1 to 1.5 N/50 mm.

12. The double-sided pressure-sensitive adhesive tape or sheet according to claim 7, wherein a peel strength (peeling angle: 180°, tensile speed: 300 mm/min, temperature: 23° C., humidity: 50% RH) of the lighter releasing-side releasably treated layer is within a range of from 0.01 to 0.3 N/50 mm.

* * * * *